ZERO PHASE SHIFT FILTER
Filed Oct. 21, 1965
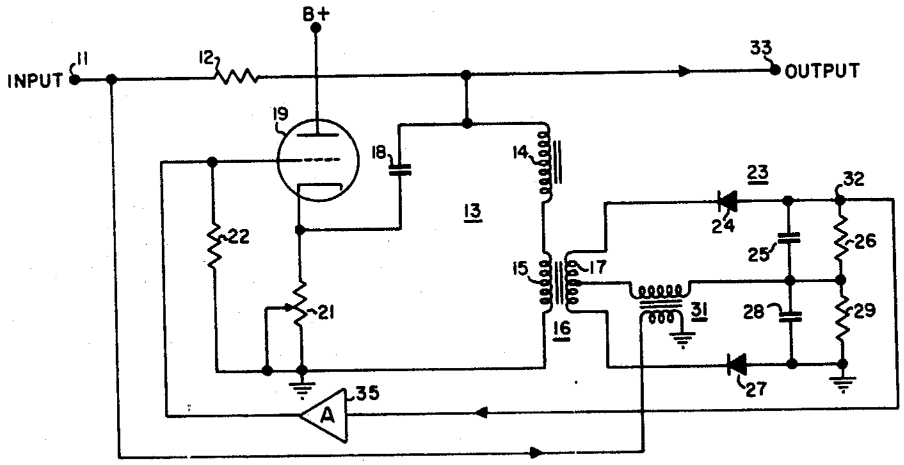
INVENTOR
MAXIME G. KAUFMAN
HUGH B. GARDNER
BY V. J. Di Pietro AGENT
[signature] ATTORNEY United States Patent Office 3,394,323
Patented July 23, 1968

3,394,323
ZERO PHASE SHIFT FILTER

Maxime G. Kaufman, Camp Springs, and Hugh B. Gardner, Forest Heights, Md., assignors to the United States of America as represented by the Secretary of the Navy Filed Oct. 21, 1965, Ser. No. 500,440
1 Claim. (Cl. 333—17)

ABSTRACT OF THE DISCLOSURE

A zero phase-shift filter which includes an input resistor connected to a variable tank circuit with the output taken at the junction of the resistor and tank circuit. The phase of the signal in the inductive branch of the tank circuit is compared with the phase of the input signal and the difference is used to automatically adjust the resistance in the capacitive branch of the tank circuit and thereby vary the phase of the signal in the tank circuit until it is in phase with the input signal.

The invention described herein may be manufactured and used by or for the Government of the United States of America for governmental purposes without the payment of any royalties thereon or therefor.

The present invention relates to a filter circuit and more particularly to an improved filter circuit which automatically retunes to provide zero phase shift for the signal to be filtered.

Those concerned with the development of filtering systems wherein the phase of the frequency of interest must not shift, have long recognized the need for a filter circuit for removing noise from a signal and yet compensating automatically for any resultant phase error.

Prior methods for compensating for the resultant phase error usually require manual or computer correction of the data. Many of these methods have proved to be slow and inaccurate. The present invention fills the requirements by providing a zero phase-shift filter which simultaneously adequately filters noise from the signal of interest and produces an output signal which is in phase with the input signal.

The general purpose of this invention is, therefore, to provide a filter which embraces all the advantages of similarly employed selective filters and which automatically compensates for any resultant intrinsic phase shift. To obtain this, the present invention provides a unique circuit arrangement, comprising a parallel resonant circuit wherein a capacitor in one branch of the circuit is coupled in series to a parallel circuit comprising a variable impedance means and an adjustable resistor. The parallel resonant circuit is inductively coupled to a phase-sensitive detector which compares the phase of the signal through the inductive branch of the resonant circuit with the input signal to be filtered and then produces a direct current (D.C.) output signal which controls the impedance of the variable impedance means coupled to the resonant circuit. Consequently, by varying the impedance of the variable impedance means, the phase of the parallel resonant circuit is altered so that the phase of the signal being filtered remains essentially unchanged.

An object of the present invention is to provide an improved filter circuit having an automatically tuned resonant circuit which provides zero phase shift.

Another object of the present invention is to provide a simple and inexpensive filter circuit which continually compares the phase of the filtered signal with the signal to be filtered for controlling the selectivity of the filter in response to that comparison.

A further object of the present invention is to provide a filter which provides zero phase shift and yet effectively filters the noise from a frequency modulated signal of interest.

Other objects and many of the attendant advantages of this invention will be readily appreciated as the same becomes better understood by reference to the following detailed description when considered in connection with the following drawing wherein:

The figure illustrates schematically the improved filter circuit of the present invention.

Referring now to the drawing, there is shown in the figure a filter system having an input 11 for receiving a phase modulated signal. The input signal is coupled through a resistor 12 to a parallel resonant circuit 13 including an inductive network comprising inductor 14 and the primary 15 of transformer 16. The resonant circuit also includes a capacitor 18 coupled to the output of a cathode follower circuit comprising a triode 19 and a potentiometer or adjustable resistor 21. The cathode resistor 21 forms part of the capacitive network of the resonant circuit 13. Capacitor 18 of parallel resonant circuit 13 is therefore essentially coupled in series with a parallel circuit comprising triode 19 and a resistor 21. A grid resistor 22 is coupled between the grid of triode 19 and ground.

Phase detector 23 is coupled to the inductive network of the parallel resonant circuit by means of transformer 16. A diode 24 has its cathode coupled to the upper terminal of secondary winding 17 of transformer 16 and its anode connected to an R-C circuit comprising capacitor 25 and resistor 26. A diode 27 has its cathode coupled to the lower terminal of secondary winding 17 and its anode coupled to an R-C circuit comprising capacitor 28 and resistor 29. The junction of the anode of diode 27, capacitor 28, and resistor 29 is grounded to provide a voltage reference.

A transformer 31 is provided for receiving the input signal as a reference frequency for phase detector 23. The primary of transformer 31 has one terminal coupled directly to input 11 and the other terminal grounded. The secondary of transformer 31 has one terminal connected to the center tap of secondary 17 of transformer 16 and the other terminal connected to a common connection of capacitors 25 and 28 and resistors 26 and 29. The function of the phase detector is to provide a D.C. output signal at terminal 32 which is proportional to the phase difference between the signals appearing at the primaries of transformers 16 and 31. At the primary of transformer 31 is the input signal which provides the reference phase while the signal at the primary 15 of transformer 16 is a portion of the input signal which has been filtered. In the phase detector 23 the R-C circuits 25–26 and 28–29 should have a time constant sufficiently large so that the phase detector functions as a peak-reading voltmeter for either half of the sinusoidal voltage cycle. Detector 23 is a conventional push-pull phase detector which produces a D.C. voltage at output 32 which is dependent upon the vector sum and difference of the two voltages whose phase is being compared at the primaries of transformers 16 and 31. In the phase detector, two D.C. voltages are formed, one proportional to the amplitude of the vector sum of the two sinusoids to be compared, and the other to the difference between the two sinusoids. The difference between these two D.C. voltages is a function of the amplitude of the A.C. voltages and their phase difference. The output signal is essentially the difference between the voltages developed by diode 24 and diode 27. In practice, the time constant of the R-C circuits of the detector should be approximately ten times the period of the input waveform. The D.C. output of the detector, which is proportional to the phase difference of the compared signals, is coupled to the grid of triode 19. In certain cases it may be desired to increase the gain of that D.C. signal; to accomplish this amplifier 35 is coupled in the path between output 32 of phase detector 23 and the grid of triode 19.

For optimum results, the primary 15 of transformer 16 should be much smaller than inductor 14 and a ratio of 1:50 is considered suitable. Transformer 16 should be a 1:1 transformer while transformer 31 should be a 1:3 transformer. Resistor 12, which is the input resistor, should approximately equal ten times the impedance of the filter comprising capacitor 18, inductor 14, adjustable resistor 21, and primary 15 of transformer 16. Cathode resistor 21 should be approximately equal to ten times the impedance of the primary 15 of transformer 16.

In operation, a phase modulated signal is applied at input 11 and is applied across resistor 12 to parallel resonant circuit 13 for filtering noise from the input signal. A small portion of the signal in the inductive branch is inductively coupled by transformer 16 to detector 23 which provides a D.C. output signal to the cathode follower circuit. In the capacitive network of the resonant circuit, triode 19 and resistor 21 are effectively in parallel to provide a resistance in the capacitive branch which is varied by a change of the signal on the grid of triode 19 which receives the D.C. output of phase detector 23. By varying the potential on the grid, therefore, the impedance of triode 19 is varied so that the effective impedance of the parallel circuit seen by the capacitive branch of the resonant circuit is varied so as to cause a cancellation of the phase shift normally acquired by the signal as it passes through the filter to output 33. Resistor 21 is manually adjustable to provide the desired degree of sensitivity and for the initial setting of the operating point. It is therefore seen that any shift in the phase of the signal being filtered with respect to the phase of the input reference signal is sensed by the phase detector which causes the parallel resonant circuit to automatically retune to the opposite phase increment carried by the incoming signal after it has passed through the filter to output 33.

In summary, the present invention provides a zero phase shift filter, having an automatic phase-retuning parallel resonant circuit. A phase detector is provided which continually senses the difference in phase between a portion of the input signal through the inductive branch of the resonant circuit, and the input signal as a phase reference. The output of the phase detector controls the impedance of the triode in the capacitive branch of the resonant circuit to retune the phase parameter of the circuit so as to cause the net phase shift of the signal to approach zero as it traverses the filter.

It is within the scope of this invention to employ other phase comparison networks for the phase detector specifically described as well as other components which may be coupled to the resonant circuit and controllable by the output of such phase comparison networks. Any component may be used in the resonant circuit having an impedance capable of being varied. A transistor, for example, or any other suitable semiconductor device, may be substituted for triode 19.

Obviously many modifications and variations of the present invention are possible in the light of the above teachings. For example, the relationship between the values of components set forth herein is merely a suggested relationship and is not intended to be limiting. It is therefore to be understood that within the scope of the appended claim, the invention may be practiced otherwise than as specifically described.

What is claimed and desired to be secured by Letters Patent of the United States is:

1. An automatically tuning filter circuit for providing a filtered output signal which is in phase with an input signal to be filtered, comprising:

an input terminal for receiving said input signal,
a voltage divider circuit connected between said input terminal and ground,
said voltage divider circuit consisting of an input resistor in series with a parallel resonant circuit,
an output terminal located at the junction of said resistor and said parallel resonant circuit for taking out said filtered output signal,
said parallel resonant circuit consisting of an inductive branch and a capacitive branch,
said capacitive branch including a capacitor in series with a resistive circuit,
said resistive circuit including a variable resistor and a triode having a cathode, grid and plate,
said cathode being directly connected to the junction of said variable resistor and said capacitor,
said plate being directly connected to a voltage source,
said inductive branch including an inductor in series with the primary winding of a transformer,
phase sensitive detector means for comparing the phase of two inputs,
one input of said phase detector being received directly from said input terminal while the other input of said phase detector is received from the secondary winding of said transformer, and
the output of said phase detector being connected to said grid to vary the plate-to-cathode resistance of said triode which is connected in parallel to said variable resistor to thereby vary the resistance in said capacitance branch and thus vary the phase of said resonant circuit and produce a filter output signal in phase with said input signal.

References Cited

UNITED STATES PATENTS

| | | | |
|---|---|---|---|
| 2,908,868 | 10/1959 | Jenson et al. | 331—36 X |
| 3,187,275 | 6/1965 | Stanley | 333—17 |
| 3,305,776 | 2/1967 | Duncan et al. | 334—16 X |

ROY LAKE, *Primary Examiner.*

J. B. MULLINS, *Assistant Examiner.*